BEST AVAILABLE COPY
J. N. REYNOLDS.
LINE SWITCH.
APPLICATION FILED JUNE 8, 1915.
Reissued Dec. 26, 1916. 14,236.
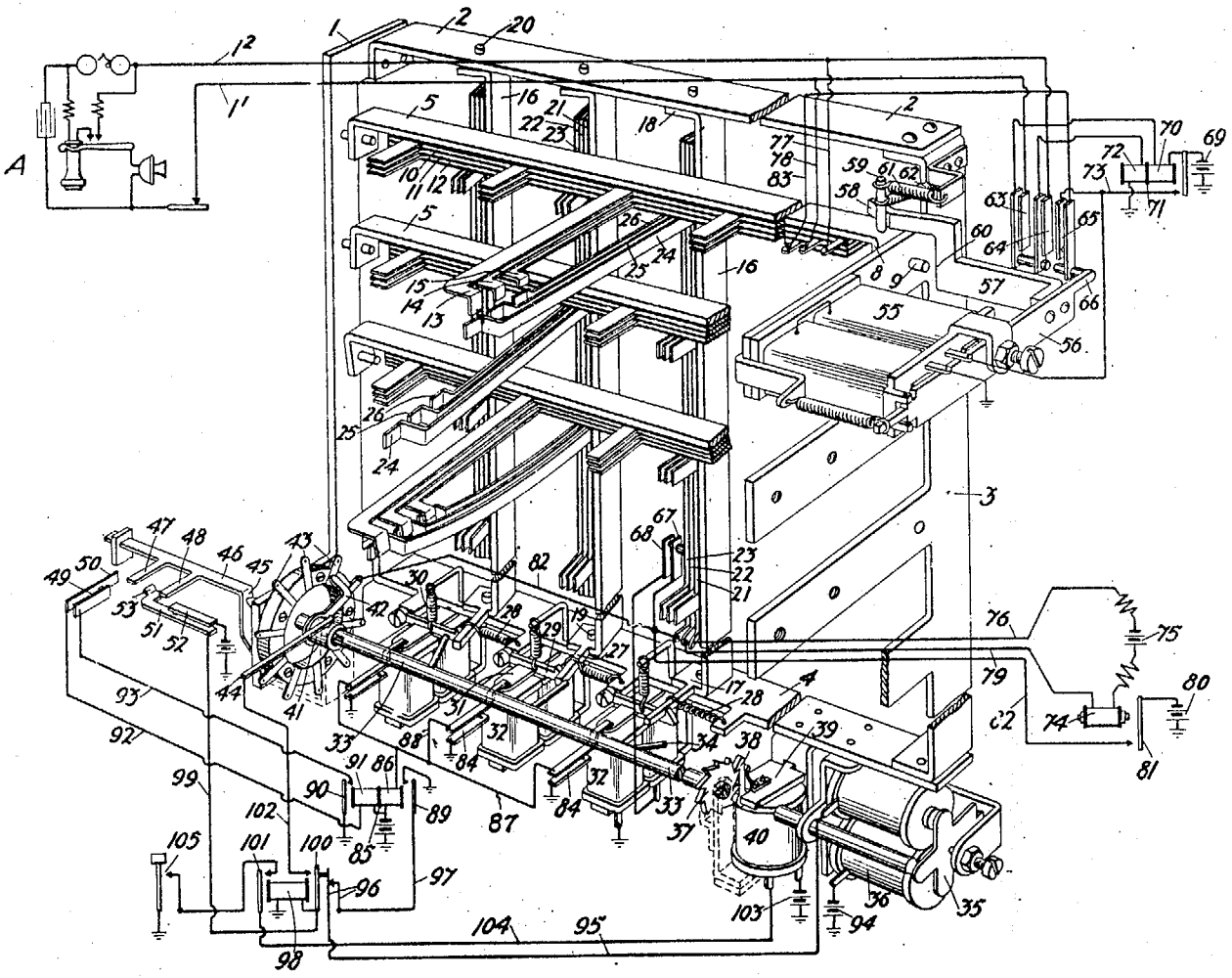
Witnesses:
O. B. M. Guthe.
J. E. Rasmussen
Inventor:
John N. Reynolds
by A. C. Fraser Att'y.

BEST AVAILABLE COPY

UNITED STATES PATENT OFFICE.

JOHN NEWBERRY REYNOLDS, OF GREENWICH, CONNECTICUT, ASSIGNOR, BY MESNE ASSIGNMENTS, TO WESTERN ELECTRIC COMPANY, INCORPORATED, A CORPORATION OF NEW YORK.

LINE-SWITCH.

14,236. Specification of Reissued Letters Patent. Reissued Dec. 26, 1916.

Original No. 1,131,734, dated March 16, 1915, Serial No. 766,879, filed May 10, 1913. Application for reissue filed June 8, 1915. Serial No. 32,977.

*To all whom it may concern:*

Be it known that I, JOHN N. REYNOLDS, a citizen of the United States, residing at Greenwich, in the county of Fairfield and State of Connecticut, have invented a certain new and useful Improvement in Line-Switches, of which the following is a full, clear, concise, and exact description.

This invention relates to a telephone switch and is particularly designed for use as a line switch, although it may be used for other purposes. This switch, in the embodiment herein disclosed, may be arranged to serve a group of one hundred subscribers' lines and a corresponding group of trunk lines.

One of the objects of this invention is the provision of a switch by which the connection between incoming lines and outgoing lines may be effected by the successive rotary movement of a pair of bars or shafts.

Another object is the provision of a simple switch structure of this type by means of which large groups of lines may be served.

Still another object of this invention is the provision of combined mechanical and electrical testing means for normally maintaining a plurality of trunks definitely preselected whereby they will be successively united with lines on which calls have been initiated.

Other objects and advantages will appear from time to time as the description of the invention progresses.

The embodiment of the apparatus herein disclosed comprises essentially a plurality of rotatable line bars or shafts, each having multipled sets of contacts, one for each trunk and a plurality of rotatable trunk bars arranged at right angles to the line bars, each trunk bar having multipled sets of contacts, one for each line bar, and means whereby said bars may be rotated to effect connection between one of the sets of multipled terminals on any line bar and the corresponding set on any trunk bar.

For a more complete description of the device, reference is now made to the drawing which shows an enlarged perspective view of the switch with parts broken away and a circuit diagram such as might be employed in the operation of the device.

Referring now to the drawing, 1, 2, 3 and 4 represent frame members which are rigidly secured together, the opposite members being substantially parallel. Pivotally mounted between the members 1 and 3 is a plurality of line bars or shafts 5. Each of these bars is provided at one end with a right-angular extension 6 through which projects a pivot pin 7. The other end also has a right-angular extension 8 from which projects a pivot pin 9 received by an aperture in the frame member 3. Secured to the bars 5 but insulated therefrom and from each other are three conducting strips 10, 11 and 12 provided with the integral multiply connected contact springs 13, 14 and 15 respectively. Each line bar would carry as many of these sets of contacts as there are trunk bars in the structure.

Pivotally mounted between the frame members 2 and 4 is a plurality of trunk bars or shafts 16, one being provided for each trunk or connecting circuit. These bars are pivotally mounted by means of the apertures in the right-angular extensions 17 and 18 at each end thereof receiving the pins 19 and 20 respectively. Secured to the bars 16 but insulated therefrom and from each other are three conducting strips 21, 22 and 23. These strips are provided with a plurality of sets of integral spring contacts 24, 25 and 26 respectively, one set being provided for each line bar at the switch, or for each subscriber's line in the group. These sets of springs project from the bars of the sets at their adjacent points or, in other words, at their points of intersection. Projecting from the extension 17 of each trunk bar is a catch lever 27 normally retained in retracted position by a spring 28. Pivotally secured to the bar 4 is a plurality of catch members 29, one for each trunk bar, adapted when the trunk bar is rotated in clockwise direction to engage and hold the catch member 27. Springs 30 are provided for holding the catch members in their operative position. Secured to the catch members 29 are armatures 31 of the trip magnets 32 respectively.

Rotatably mounted parallel to the bar 4 and adjacent to the levers 27 is a set rod 33. This rod is provided with a plurality of spirally arranged pins 34, one for each lever 27. These pins are so arranged that one at a time and only one, may be placed opposite to its respective lever 27, whereby upon lon-

BEST AVAILABLE COPY gitudinal movement of the set rod 33 to the left, as viewed in the drawings, the trunk bar having the particular lever 27 engaged will be rotated into set or selected position. This longitudinal movement of the rod 33 is caused by the armature 35 of the electromagnet 36 engaging the end of set rod 33 as clearly shown in the drawings.

Rotative with but slidably mounted on the rod 33 is a ratchet wheel 37 and operatively related thereto is a pawl 38 carried by the armature 39 of the electromagnet 40, by means of which the set rod may be rotated. Slidably but non-rotatably mounted on the bar 33, near the left end thereof, is a collar 41. Secured to this collar is a wiper 42 adapted upon rotation of the set rod 33 to traverse the test contacts 43. The wiper 42 is of sufficient size to bridge the distance between two adjacent test contacts 43. Mounted for wiping engagement with the collar 41 is a brush 44. A leaf spring 45, against which the end of the rod 33 bears, is provided for returning the set rod to its normal position. Arranged for engagement by the spring 45 is a contact operating member 46 having projecting lugs 47 and 48. Coöperating with the lug 47 is a pair of springs 49 and 50, contacts between which is interrupted only at the moment the rod 33 reaches the end of its travel. Arranged for coöperation with the lug 48 is a pair of contact springs 51 and 52. The spring 51 is provided with a cam projection 53. Upon the movement of the rod 33 to the left the lug 48 engages the upper side of the cam projection 53. Upon the return movement, however, the lug 48 passes under the cam projection 53, causing a momentary engagement of contacts 51 and 52.

Mounted on the frame member 3, one for each line bar, is a plurality of electromagnets 55. Each magnet 55 is provided with a pivoted armature 56 having a right-angular projection 57 ending in a cam member 58. Projecting upwardly from each line bar 5 and in a position for engagement by its respective cam member 58 is a pin 59 by means of which the line bar may be rotated upon attraction of the armature 56. Upon further attraction of the armature 56 the shoulder 60 on the member 57 is arranged to engage the pin 9 in such a manner as to force the line bar to the left, as viewed in the drawing. Springs 61 and 62 are provided for returning the line bar to its normal position. A set of contacts 63, 64 and 65 are arranged to be operated by a projecting finger 66 on the armature 56. These springs are so arranged that contact 65 is closed before contacts 63 and 64 are opened.

Secured to each trunk bar is an insulating projection 67 which upon clockwise rotation of the bar to its set or selected position is arranged to engage and close the normally open contacts 68. It is believed that the device will now be better understood by describing its operation in connection with the circuits. In following this description it should be remembered that in normal position some one of the trunk bars or shafts 16 is always maintained in a set preselected position, that is, the catch lever 27 thereof is held to the left by its catch 29, and also that one of the pins 34 on the rod 33 is in operative position to the lever 27 of a bar associated with an idle trunk. Thus normally one of the bars or shafts 16 is always rotated to its preselected position and another bar 16 is ready for preselection, that is, one of the pins 34 on the rod 33 is in such relation to the lever 27 of a bar associated with another idle trunk, that upon a longitudinal movement of rod 33, it will force lever 27 into engagement with its catch 29. By preselecting two bars 16 for successive operation, when two calls are originated practically simultaneously, no delay is necessitated in waiting for the extension of the same.

Upon the subscriber at A removing his receiver from the hook, a circuit will be completed from battery 69 through winding 70 of relay 71, contacts 63, side $l'$ of the line, telephone apparatus at the substation, side $l^2$ of the line, contacts 64, and winding 72 of electromagnet 71 to ground. Relay 71 is thereupon energized and completes through its armature a circuit from battery 69, through said armature and contact, conductor 73, and winding of electromagnet 55 to ground. Armature 56 is thereupon attracted and through engagement of the cam 58 with the pin 59 on the line bar causes said line bar to rotate. The rotation of the line bar 5 causes the contact terminals 13, 14 and 15 to move downwardly, thus positioning one set of terminals in operative relation to the contacts 24, 25 and 26 respectively of the set or preselected trunk. Upon the further attraction of the armature 56, the engagement of the shoulder 60 with pin 9 forces the bar 5 to the left, bringing the contacts of the line bar into firm engagement with the trunk terminals and also moving the unengaged terminals of the line bar to a position where they will not be engaged by the terminals on another trunk bar. Upon engagement of the line terminals 13 and 14 with the trunk terminals 24 and 25, a circuit is completed for the relay 74, from battery 75, through conductor 76, conducting strip 21, terminals 24, 13, conducting strip 10, conductor 77, side $l^2$ of the line, substation apparatus, side $l'$ of the line, conductor 78, conducting strip 11, terminals 14 and 25, conducting strip 22, conductor 79, and winding of relay 74 to battery, thus energizing the relay which, upon attracting its armature, closes a circuit from battery

BEST AVAILABLE COPY 80, armature 81 and contact, conductor 82, contacts 68, now closed with the trunk bar in set position, winding of trip magnet 32, to ground.

A branch from the circuit just traced extends from battery 80 through armature 81, conductor 82, conducting strip 23, contacts 26, 15, conducting strip 12, conductor 83, contact 65 now closed by the attraction of 56, through winding of magnet 55 to ground, thus providing a holding circuit for the magnet 55. The further attraction of the armature 56 has opened the contacts 63 and 64, and the relay 71 is now deënergized.

Another branch from the conductor 82 extends to the test contact 43 individual to the selected trunk for a purpose to be hereinafter specified.

The energizing circuit just traced through the electromagnet 32 causes its armature to be attracted, carrying with it the catch member 29 and thus releasing the trunk bar which is returned to its normal position by its spring 28. The terminals of the set which are in engagement with the line terminals, however, remain in contact therewith due to the flexibility of said terminals. The other sets of terminals carried by the trunk bar are rotated in an anti-clockwise direction or to the right, as viewed in the drawings, to place them in a position where they will not be engaged by the terminals carried by the bar of the next calling line. The attraction of the armature 31 of magnet 32 closed its contact 84, thus completing a circuit for the relay 85, from battery, through the winding 86 of said relay, conductor 87, conductor 88, and contact 84 to ground. The relay 85 is thereupon energized and attracts its armatures 89 and 90. The attraction of armature 90 completes a holding circuit for said relay from battery through the winding 91, conductor 92, contact springs 50 and 49, conductor 93, contact and armature 90 to ground. The attraction of the armature 89 completes a circuit from battery 94, through set magnet 36, conductor 95, normally closed contact 96, conductor 97, armature 89 and contact to ground. The electromagnet 36 by the attraction of its armature 35 causes the set rod 33 to move to the left, and by means of the finger 34 now in position to engage a lever 27 of the selected trunk, causes the respective trunk bar to assume a set position ready for engagement by the line terminals on the bar of the next line to call.

As the engagement between contacts 49 and 50 is not broken until the set rod reaches approximately the end of its stroke, the complete travel of the rod is assured. When the rod reaches the end of its travel, the contacts 49 and 50 are separated, interrupting the holding circuit for the relay 85, causing its armatures to fall back interrupting at armature 89 the previously traced circuit for the set magnet 36. The rod 33 thereupon returns to normal, closing momentarily in its passage the contacts 51 and 52, thus completing a circuit for the test relay 98 from battery, through contacts 52, 51, conductor 99, and winding of the said relay to earth. The relay is thereupon energized and attracts its armatures 100 and 101. The attraction of the armature 100 completes a holding circuit for the test relay, from battery 80, through armature 81 and contact, conductor 82, test contact 43, wiper 42, brush 44, conductor 102, contact and armature 100, winding of said relay to ground. The attraction of the armature 101 completes a stepping circuit for the stepping magnet 40 from battery 103, winding of electromagnet 40, conductor 104, armature 101 and contact, through interrupter 105 to ground. The attraction of the armature 39 of electromagnet 40 causes through the pawl 38 the rotation of the set rod 33 to successively position the fingers 34 in operative relation to the levers 27 of the trunk bars. As long as the wiper 42 is in engagement with a test contact 43 of a busy trunk line upon which battery potential is impressed from battery 80, the test relay will hold up and the stepping circuit will remain completed, the set rod being rotated by the successive energization and deënergization of the electromagnet 40 due to the breaking of its circuit by the interrupter 105. When, however, the wiper reaches a test contact 43 of an idle trunk, no battery potential will be thereon and the test relay 98 will become deënergized. The retraction of the armature 101 will open the stepping circuit for the magnet 40, thus stopping the set rod 33 with one of the fingers 34 in operative relation to a lever 27, whereby upon the longitudinal movement of the set rod the trunk bar will be rotated to set position, thus leaving the apparatus in position for the reception of the next call. Upon the initiation of the next call and the first actuation of rod 33 (longitudinal movement) the finger 34 which is in position to engage the lever 27 of the trunk bar which is ready for preselection, will force this lever 27 into engagement with its associated catch 29.

Upon the calling subscriber hanging up his receiver at the termination of the conversation, the circuit for the relay 74 is interrupted, and the retraction of its armature 81 opens the holding circuit for the electromagnet 55. The deënergization of the electromagnet 55 causes the retraction of its armature 56, thus releasing the line bar which is thereupon returned to normal by the springs 61 and 62 carrying therewith the terminals 13, 14 and 15, previously in engagement with the trunk terminals 24, 25 and 26, thus returning all the previously op-

BEST AVAILABLE COPY erated parts to normal with the exception of the selected trunk which is now in set position.

We have now described the complete cycle of operation. Briefly described this cycle is as follows: At all times one of the trunk bars will be in set or retracted position. Now upon the initiation of a call, the line bar will be first rotated to cause engagement of the line terminals with the trunk terminals at the point of intersection of the bars, and then moved longitudinally to remove the multiple terminals from the path of other trunk terminals. The engagement of the line terminals with the trunk terminals operates to effect the completion of a circuit for the trip magnet 32 individual to the trunk bar, whereby the bar is released and returned, with the exception of the terminal of the engaged set, to normal position. The attraction of the armature 31 of electromagnet 32, in addition to releasing the trunk bar, completes the circuit for the relay 85 which at its right armature 89 closes a circuit for the set magnet 36, which upon its energization causes the next trunk bar to be rotated and set in the manner previously described. The return to normal of the set rod 33 momentarily closes contacts 51, 52, causing the energization of the test relay 98. The attraction of the right armature of the relay 98 closes a holding circuit therefor through the wiper 42 and the test contact 43. The attraction of the left armature completes a stepping circuit for the stepping magnet 40, thus causing the rotation of the set rod which continues to rotate until the wiper 42 engages a test contact 43 associated with an idle trunk, when the test relay circuit will be interrupted and all parts, with the exception of the set trunk bar, will be returned to normal position.

It is to be understood that the circuits employed with this switch in a complete telephone system would differ in some respects from those here shown. In such a complete system, means would preferably be provided for interrupting the leads 73 to all the line magnets at the switch from the time a locking circuit was completed from battery 80 for the magnet 55 of the calling line, until the set rod had been rotated to place a finger opposite a lever 27 of the bar of the second next idle trunk.

As many modifications and minor changes in the invention described will readily suggest themselves to any one skilled in the art, I do not wish to be limited to the details of construction herein disclosed, but only by the scope of the appended claims.

I claim:

1. In a switch, a group of terminals at said switch, a group of other circuit terminals for engagement with said first circuit terminals, groups of rotatable shafts corresponding to said groups of terminals, and means whereby the successive rotation of a shaft of each group will cause interengagement of a pair of terminals.

2. In combination telephone circuits, a switch associated therewith, terminals of said circuits at said switch, other circuit terminals for engagement with said first circuit terminals, groups of rotatable shafts corresponding to said circuits adjacent and at an angle to each other, and means whereby the successive rotation of a pair of intersecting shafts will cause interengagement of the corresponding terminals.

3. In a switch, a group of line terminals, other circuit terminals arranged for engagement with said line terminals respectively, groups of bars arranged adjacent to each other in intersecting planes, and means for rotating a bar of each group in a predetermined order, whereby engagement of a line terminal with one of said other circuit terminals will be effected.

4. In a telephone system, subscribers' lines and trunk lines, an exchange, terminals of said lines and trunk lines respectively at said exchange, and means for connecting said line terminals to said trunk terminals, said means comprising rotatable bars individual to said subscribers' lines and said trunk lines respectively.

5. In a switch, a plurality of line bars and trunk bars pivotally mounted adjacent each other in intersecting planes, multipled terminals of said lines and of said trunks on said line bars and trunk bars respectively, and means for successively rotating said bars, whereby engagement between said line terminals and trunk terminals may be effected.

6. In a switch, the combination of sets of intersecting shafts, contact sets at the intersections of said shafts, means, effective upon successive angular displacement of a shaft of one set and a shaft of the other set, but ineffective upon such displacement of the shafts in reverse order, for operating a contact set.

7. In a switch, the combination of sets of intersecting shafts, contact sets at the intersections of said shafts, means effective upon conjoint angular displacement of two intersecting shafts for operating a contact set, and electromagnets for rocking said shafts.

8. In combination a pair of telephone circuits, a switch associated therewith, rotatable shafts, terminals of said circuits carried by said shafts respectively, said terminals being so arranged that the successive rotation of said shafts will cause interengagement thereof.

9. In combination, two groups of circuits, a switch associated therewith, terminals of each group at said switch, sets of rotatable shafts, the shafts of one set being

BEST AVAILABLE COPY at an angle to those of the other, and means whereby the selective and successive rotation of a shaft of each set will effect interengagement of the terminals of a predetermined circuit of each group.

10. In combination, two groups of circuits, a switch comprising sets of rotatable shafts, the shafts of one set being at an angle to those of the other, multiple terminals of the circuits of said groups carried by the shafts of said sets respectively, and means whereby the selective and successive rotation of a shaft of each set will effect interengagement of the terminals of a predetermined circuit of each group.

11. In combination, two groups of telephone circuits, a switch comprising sets of rotatable shafts, the shafts of one set being at an angle to those of the other, multiple terminals of the circuits of said groups carried by the shafts of said sets respectively, and means whereby the selective and successive rotation of a shaft of each set in a predetermined order only will effect interengagement of the terminals of a predetermined circuit of each group.

12. In combination, two groups of circuits, a switch comprising sets of rotatable shafts, the shafts of one set being at an angle to those of the other, multipled terminals of the circuits of said groups carried by the shafts of said sets respectively, means whereby the selective and successive rotation of a shaft of each set will effect interengagement of the terminals of a predetermined circuit of each group, and means whereby some one of the shafts of one set is normally maintained rotated to a set or selected position.

13. In combination, two groups of circuits, a switch comprising sets of rotatable shafts, the shafts of one set being at an angle to those of the other, multipled terminals of the circuits of said groups carried by the shafts of said sets respectively, means whereby the selective and successive rotation of a shaft of a set will effect interengagement of the terminals of a predetermined circuit of each group, and means for then actuating said shafts to move their respective terminals out of the line of travel of the terminals carried by the shafts of the other sets.

14. In combination, two groups of circuits, a switch comprising two sets of rotatable shafts, the shafts of one set being at an angle to those of the other, contact terminals of the circuits of said groups carried by the shafts of said sets respectively, at adjacent points, means whereby the rotation of a shaft of each set in a definite order will effect engagement of their respective contacts, and means comprising a rotatable and longitudinally movable rod whereby some one of the shafts of one set is normally maintained rotated to a set or selected position.

15. In combination, two groups of circuits, a switch comprising two sets of rotatable shafts, the shafts of one set being at an angle to those of the other, contact terminals of the circuits of said groups carried by the shafts of said sets respectively, means whereby the rotation of a shaft of each set in a definite order will effect engagement of their respective contacts, a lever projecting from each of the shafts of one set, a rotatable and longitudinally movable rod adjacent said levers, spirally arranged pins on said rod, one for each lever, means for rotating said rod to place a pin in operative relation to one of said levers, and means for moving said rod longitudinally whereby some one of said shafts is normally maintained rotated to a set or selected position.

16. In combination, two groups of circuits, a switch comprising two sets of rotatable shafts, the shafts of one set being at an angle to those of the other, contact terminals of the circuits of said groups carried by the shafts of said sets respectively, means whereby the rotation of a shaft of each set in a definite order will effect engagement of their respective contacts, the shafts of one set being provided with spring retracted levers, a rotatable and longitudinally movable rod adjacent to said levers, a series of spirally arranged pins on said rod, one for each lever, means for rotating said rod to position one of said pins in operative relation to a lever, means for longitudinally moving said rod against said lever to rotate the shaft of a selected trunk, a catch for engaging said lever to retain said shaft in set position, and means for disengaging said catch upon completing a connection, whereby the other terminals of said shaft will be positioned out of the line of travel of other terminals.

17. In combination, two groups of circuits, a switch comprising sets of rotatable shafts, multiple terminals of the circuits of said groups carried by the shafts of said sets, respectively, means for rotating a shaft of each set whereby interengagement of the terminals of a circuit of each group will be effected, and means for thereupon moving said shafts to position the unengaged terminals of each out of the line of travel of the terminals carried by the shafts of the other set.

18. In combination, two groups of circuits, a switch comprising sets of rotatable shafts, multiple terminals of the circuits of said groups carried by the shafts of said sets respectively, means for rotating a shaft of each set whereby interengagement of the terminals of a circuit of each group will be effected, and means for thereupon moving

BEST AVAILABLE COPY one of said shafts longitudinally and for reversely rotating the other to position the unengaged terminals of each out of the line of travel of the terminals carried by the shafts of the other set.

19. In combination, a group of calling lines, a group of trunks, automatic switching means for extending any of said calling lines to any of said trunks, means for preselecting a plurality of said trunks for seizure in succession by calling lines, and electrical testing means for controlling the operation of said last mentioned means.

20. In combination, two groups of lines, a plurality of switching means for connecting a line of one group to a free line of the other group, mechanical means for preselecting one of said switching means for operation, and electrical testing means for selecting another one of said switching means for the successive operation.

21. In combination, incoming lines and outgoing lines, terminals for said incoming lines, switching devices each carrying the movable terminals of one of said outgoing lines, electromagnetic means for actuating said movable terminals adapted to connect a calling incoming line to an outgoing line, means for physically preselecting one of said switching devices and means for electrically allotting for preselection another of said switching devices.

22. In combination, two groups of lines, means for extending a calling line of one group to a free line of the other group, mechanical means for preselecting one line of said other group and electrical testing means for definitely allotting for mechanical preselection another line of said other group.

23. In a telephone exchange system, incoming lines and outgoing lines, normally inactive contacts for each of said lines, actuating devices for causing engagement of the contacts of said incoming lines with the contacts of said outgoing lines, means for maintaining an idle one of said contacts in an actuated position for first operation, and electrical testing means for predetermining an idle inactive contact for second operation.

24. In combination, incoming lines and outgoing lines, terminals for said incoming lines, switching devices, each carrying movable terminals of one of said outgoing lines, electromagnetic means for actuating said movable terminals to connect with the terminals of calling incoming lines, an electromagnetic mechanism for moving an idle one of said movable terminals into a position in which it may engage the terminals of a calling incoming line, and electrical testing means for definitely allotting another one of said movable terminals for said movement.

25. In combination, incoming lines and outgoing lines, a switch comprising two sets of rotatable shafts, the shafts of one set being at an angle to those of the other, contact terminals of said incoming and outgoing lines carried by the shafts of said sets respectively, means whereby the rotation of a shaft of each set in a definite order will effect engagement of their respective contacts, and means comprising a movable rod whereby some one of the shafts of one set is normally maintained rotated to a set position and another one of the shafts of said set is preselected for rotation.

In witness whereof, I hereunto subscribe my name this 10th day of May 1915.

JOHN NEWBERRY REYNOLDS.